Patented Jan. 1, 1929.

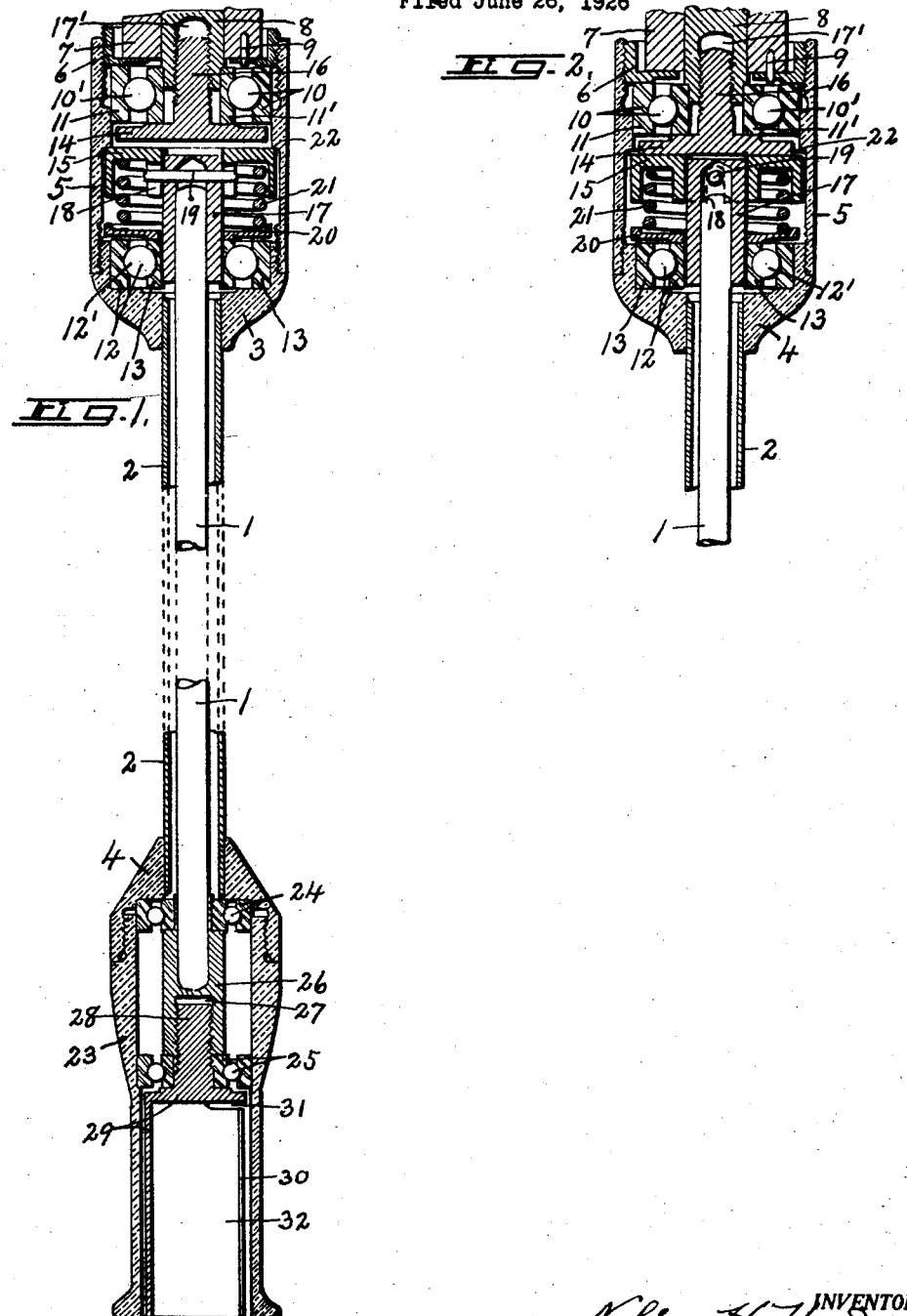

1,697,595

UNITED STATES PATENT OFFICE.

NELSON H. HENDERSON, OF SYRACUSE, NEW YORK.

FRICTION CLUTCH.

Application filed June 26, 1926. Serial No. 118,739.

This invention relates to a flexible shaft clutch as a unitary article of manufacture adapted to be coupled to the armature shaft of an electric motor or other driving element for transmitting rotary motion to a tool-holder which is capable of receiving a variety of tools or implements for various purposes.

The flexible shaft is preferably inclosed in a flexible casing which is non-rotatable except that it may be turned by hand relatively to the shaft for attaching it to and detaching it from the supporting frame for the driving element and the main object of the present invention is to provide a clutch coupling whereby the flexible shaft casing may be coupled and uncoupled to and from the supporting frame for the driving element, and may also be adjusted to different positions for connecting and disconnecting the flexible shaft to and from the rotary driving element to start and stop the flexible shaft at will without stopping the rotation of said driving element.
Another object is to provide means controlled by the relative adjustment of the coupling members for engaging and disengaging the clutch members and for placing one of the clutch members under yielding pressure when engaged with the other clutch member and thereby to provide an automatic take-up for wear in addition to maintaining driving connection between the driving and driven elements.
A further object is to construct the clutch and coupling in such manner that the various parts thereof may be easily and quickly removed or re-assembled when desired.

Other objects and uses relating to specific parts of the device will be brought out in the following description.

In the drawings:—

Figure 1 is a longitudinal sectional view of a flexible shaft including the clutch and hand piece, the central portion of the flexible shaft and casing therefor being broken away, the clutch being shown in its released position.

Figure 2 is a longitudinal sectional view of the clutch taken at right angles to that shown in Figure 1 except that the coupling member on the flexible shaft casing is adjusted to bring the clutch members into frictional engagement with each other.

As illustrated, this device comprises a flexible shaft —1— and a hollow flexible casing —2— therefor having its interior diameter slightly greater than the external diameter of the flexible shaft —1— so as to permit free turning movement of the latter therein.

The shaft —1— and casing —2— may be of any desired length but the flexible shaft is preferably longer than its casing so as to extend beyond the opposite ends thereof.

The opposite ends of the flexible casing —2— are provided with hollow circular heads —3— and —4— co-axial therewith and rigidly secured thereto by brazing or otherwise to form permanent parts thereof.

The outer end of the head —3— is reduced in diameter and threaded externally for receiving the internally threaded end of a tubular coupling member or sleeve —5— having its outer end threaded internally for engagement with an externally threaded head or coupling member —6— which is stationary or non-rotatable and may be attached to or form a part of the supporting frame of an electric motor or other power unit having a journal bearing —7— for a rotary driving element —8—.

The coupling member —6— is preferably keyed to the journal bearing —7— by means of pins —9— shown in Figures 1 and 2 to lock those parts against relative rotation and at the same time to permit them to be separated when desired.

The coupling sleeve —5— is screwed tightly upon the threaded portion of the head —3— and together with said head constitutes a cylindrical handle adapted to be screwed upon and unscrewed from the threaded portion of the supporting member —6— thus permitting axial adjustment of the sleeve —5— and its supporting head —3— relatively to the coupling member —6—, bearing —7— and driving element —8—.

This driving element —8— is rotatable in the bearing —7— and extends inwardly some distance beyond the inner end of the bearing and is additionally journaled within the sleeve —5— through the medium of ball-bearing —10— which serves the double purpose of resisting radial and end-thrust movements of the rotary driving element.

That is, this ball-bearing comprises outer and inner concentric rings —11— and —11'— having annular ball races in their adjacent faces for receiving anti-friction balls —10'—, the inner ring being engaged with the inner end of the rotary driving element —8— while the outer ring is engaged with the inner end face of the coupling member —6— and also with an annular bore in the intermediate portion of the sleeve —5—.

The head —3— on the outer end of the flexible casing —2— is provided with an inner annular socket for receiving a ball-bearing —12— similar to the ball-bearing —10— in that it is composed of inner and outer concentric rings —13— and —13— and interposed anti-friction balls —12'—.

These ball-bearings are arranged co-axially, but in axially spaced relation for receiving between them co-operative friction disks —14— and —15— constituting a friction clutch adapted to be opened and closed at will by turning movement of the coupling sleeve —5— upon the coupling member —6— in reverse directions in a manner presently described.

The clutch disk —14— extends across the inner end of the ball-bearing —10— and is provided with a reduced threaded shank —16— engaging in a threaded socket —17'— in the inner end of the rotary driving element —8— to rotate therewith and also serves to clamp the inner ball race —11'— against an annular shoulder on the driving element —8— to facilitate the rotation of said disk with the driving element and also to facilitate the assembly and removal of the ball-bearing —10—.

The outer end of the flexible shaft —1— is provided with a cylindrical head —17— secured thereto by brazing or otherwise to rotate therewith, said head being extended through central co-axial openings in the inner ball race —13— and friction disk —15— and may be secured to the inner ring —13— but is preferably fitted therein in such manner as to allow slight endwise vibratory movement of the flexible shaft during its rotation.

The friction disk —15— is splined upon the outer end of the head —17— for axial movement relatively thereto and for rotation therewith and for this purpose is provided with an inwardly projecting hub having a diametrically extending slot —18— for receiving a cross pin —19— in the upper end of the head —17— as shown more clearly in Figure 1.

A spring-supporting disk —20— is seated upon the inner ring —13— of the ball-bearing —12— around the head —17— and upon this disk is supported one end of a coiled spring —21— having its other end bearing against the inner face of the friction disk —15— for exerting outward pressure toward the companion friction disk —14—.

The coupling sleeve —5— is provided intermediate its ends with an annular shoulder —22— adapted to engage the outer end face of the friction disk —15— for forcing said disk out of engagement with its companion disk —14— when the coupling member —5— is unscrewed a pre-determined distance relatively to its companion coupling member —6— as shown in Figure 1 thereby disconnecting the flexible shaft —1— from the rotary driving element —8—.

On the other hand if the coupling sleeve —5— is screwed upon the coupling member —6— a sufficient distance the friction disk —15— will be forced into frictional engagement with the driving disk —14— thereby disengaging the shoulder —22— from the outer end face of the driven disk —15— and causing the rotating disk —14— to transmit rotary motion to the disk —15— and thence to the flexible shaft —1—.

Under these conditions the rotation of the flexible shaft —1— may be stopped and started at will independently of the driving element —8— by simply rotating the sleeve —5— by hand in one direction or the other, and it is evident that when the sleeve —5— is adjusted so as to disengage its shoulder —22— from the friction disk —15— the tension of the spring —21— will automatically force the friction disk —15— into frictional engagement with its driving disk —14—.

*Tool-holder.*

The head —4— on the end of the flexible casing —2— carrying the tool-holder is provided with an internally threaded socket in which is screwed the adjacent reduced end of a hollow or tubular handle —23— containing suitable ball-bearings —24— and —25— in axially spaced relation.

The adjacent end of the flexible shaft —1— extends into the tubular handle —23— and is provided with a head —26— brazed or otherwise secured thereto to rotate therewith, said head being preferably clamped between the adjacent ends of the inner rings of the ball-bearings —24— and —25—.

The outer end of the head —26— is provided with an internally threaded central socket —27— in which is screwed a reduced externally threaded end —28— of a tool-holder —29—.

The outer end of this tool holder is cylindrical and hollow and is divided longitudinally through one side at —30— and circumferentially through the same side at —31— to form yielding jaws as —32— for frictionally gripping and retaining a tool or other implement therein.

The ball-bearings are mounted in a cylindrical bore in the inner end of the handle —23— to permit the handle section —23— to be unscrewed and removed from the head —4— when desired.

It is now clear that when the clutch member —15— is brought into frictional engagement with the rotating driving disk —14— the flexible shaft —1— and tool holder carried thereby together with the tool in the tool-holder will be rotated in the direction of rotation of the driving element and that when it is desired to stop the rotation of the flexible shaft and parts actuated thereby it is simply necessary to turn the sleeve —5— in a direction for unscrewing it upon the coupling member —6— sufficiently to cause the shoulder —22— to disengage the friction disk —15— from the companion disk —14— or if it is desired to remove the flexible shaft and its casing from the driving element the sleeve —5— may be entirely disengaged from its companion member —6— by continuing the unscrewing operation whereupon the coupling sleeve —5— with the various operating parts therein may be withdrawn endwise from the coupling member —6—.

What I claim is:—

1. In a friction clutch of the character described, the combination with a rotary driving element and a support therefor, of a rotary driven element and a support therefor, a friction clutch having one of its members attached to the driving element and its other member rotatable with the driven element, and a coupling sleeve connecting said supports and inclosing the clutch, said sleeve being adjustable axially relatively to one of the supports and provided with means when adjusted to one position for moving one of the clutch members axially out of engagement with the other clutch member.

2. In a friction clutch of the character described, the combination with a rotary driving element and a support therefor, of a rotary driven element and a support therefor, a friction clutch having cooperative members normally spring-pressed into engagement with each other and a coupling member connecting said supports and adjustable axially relatively to one of said supports and provided with means when adjusted to one position for disengaging the clutch members against the action of said spring and when adjusted to another position for permitting said clutch members to be engaged by the action of the spring.

3. In a friction clutch, a casing having co-axial end heads relatively adjustable axially, and co-axial rotary driving and driven elements journaled respectively in said heads and provided with cooperative friction disks, one of the disks being spring-pressed toward the other disk to engage the same when the heads are relatively adjusted axially in one direction a part of said casing being adjustable angularly and provided with means for effecting the relative axial movement of the heads for engaging and disengaging the disks.

4. In a friction clutch, a casing having co-axial end heads relatively adjustable axially, and co-axial rotary driving and driven elements journaled respectively in said heads and provided with cooperative friction disks, one of the disks being spring-pressed toward the other disk to engage the same when the heads are relatively adjusted axially in one direction, and means for holding the spring-actuated disk against the action of the spring when the disks are separated.

In witness whereof I have hereunto set my hand this 16th day of June, 1926.

NELSON H. HENDERSON.